United States Patent [19]
Anderson

[11] Patent Number: 5,852,993
[45] Date of Patent: Dec. 29, 1998

[54] FUEL SYSTEM FOR INTERNAL COMBUSTION SYSTEM AND ADAPTER FOR USE IN SAME

[75] Inventor: Herman P. Anderson, Brentwood, Tenn.

[73] Assignee: Herman P. Anderson Technologies, LLC, Brentwood, Tenn.

[21] Appl. No.: 905,862

[22] Filed: Aug. 4, 1997

[51] Int. Cl.$^6$ .................................................. F02M 57/06
[52] U.S. Cl. ................................. 123/297; 123/DIG. 12; 123/527
[58] Field of Search .................................. 123/297, 527, 123/DIG. 12; 313/120

[56] References Cited

U.S. PATENT DOCUMENTS

| | | | |
|---|---|---|---|
| 3,926,169 | 12/1975 | Leshner et al. | 123/297 |
| 3,980,061 | 9/1976 | Mcalister | 123/297 |
| 4,319,552 | 3/1982 | Sauer et al. | 123/297 |
| 4,343,272 | 8/1982 | Buck | 123/297 |
| 4,383,198 | 5/1983 | Hosking | 313/120 |
| 4,448,160 | 5/1984 | Vosper | 123/297 |
| 4,546,740 | 10/1985 | Clements et al. | 123/297 |
| 5,531,199 | 7/1996 | Bryant et al. | 123/297 |

*Primary Examiner*—Erick R. Solis
*Attorney, Agent, or Firm*—J. C. Waddey, Jr.; Waddey & Patterson

[57] ABSTRACT

The internal combustion engine fuel system described includes a structure for mixing the alternative fuel, preferably hydrogen, with oxygen in ambient air to stratify the fuel. The system includes an adapter, and the adapter includes a housing mounted between spark plug and cylinder of the internal combustion engine. A plug is placed within the housing. The plug has ridges or grooves on its outer surface that act as mixing structures. Thus, when hydrogen is introduced into the adapter housing it is mixed with ambient oxygen within the chamber as it flows over the plug. The mixing structures in the housing create a vortexing action as the hydrogen flows over the plug and towards the cylinder of the engine. An electrode protrudes from the plug towards the cylinder. The electrode is preferably platinum and generates the necessary spark to create combustion of the hydrogen/air mixture adjacent to the cylinder to thereby power the cylinder in the engine. A platinum electrode is preferably used because it enhances a catalytic conversion of combustion by-products to more environmentally compatible products.

38 Claims, 6 Drawing Sheets

FUEL SYSTEM FOR INTERNAL COMBUSTION SYSTEM AND ADAPTER FOR USE IN SAME

BACKGROUND OF THE INVENTION

The present invention relates generally to a fuel system for internal combustion engines that enables the invention to utilize alternative fuels; and, more particularly to an improved fuel system for an internal combustion engine and an adapter for use in same.

The problems of air pollution caused by automobiles, lawn mowers and other vehicles that have internal combustion engines powered by gasoline is well documented. This problem is particularly described in an article in the San Diego Union Tribune, Wednesday, Sep. 25, 1996 and in Popular Science, August, 1996. Indeed, under the Clean Air Act, in the next few years cars that do not run on standard fossil fuels like gasoline will be required in several states. Currently, there are no vehicles available to meet this need.

Thus, it will be appreciated by those skilled in the art that there has been a push to seek other fuels for use in internal combustion engines. These fuels include methane, propane and gasohol.

Hydrogen has also been characterized as a promising fuel source. See Department of Energy publication entitled "Hydrogen Fuel", printed in 1978, U.S. Government Printing Office, U.S. Department of Energy, Office of Public Affairs, Washington, D.C. 20585. Particularly, the graph presented in FIG. 6, which is copied from this publication, shows the potential for hydrogen in BTUs/Lb. However, the mass energy density for hydrogen is low; and thus, hydrogen needs to be compressed before its energy potential can be realized. No prior art fuel system has been able to capture the energy of hydrogen.

Several fuel systems for use with hydrogen have been proposed. Examples are described in U.S. Pat. Nos. 4,167, 919; 4,253,428; 4,016,836; 4,178,882; 5,222,993; 5,085, 176; and 5,085,176. The problem with these prior art fuel systems is they cannot can take advantage of the alternative fuels to generate sufficient power from the fuels to drive an internal combustion engine for use in a lawn mower, automobile or other vehicle. As noted above, this is a particular problem when hydrogen is used as a fuel. Additionally, the prior art systems do not address the problem of back fire, i.e. undesired explosion of the fuel in the cylinder during the exhaust stroke of the internal combustion engine.

What is needed, then, is a fuel system for an internal combustion engine that provides a way to generate sufficient power from the alternative fuels and that reduces backfire problems. Such a system is lacking in the prior art.

SUMMARY OF THE INVENTION

It is an object of this invention to provide an improved fuel system for use with alternative fuels.

It is a further object of this invention to provide an improved fuel system for use particularly with hydrogen, and particularly to enhance the mass energy density of hydrogen.

It is still a further object of this invention to provide an adapter for use in a fuel system for an internal combustion engine that enhances the power obtained from the alternative fuels.

It is still a further object of this invention to provide an improved fuel system for an internal combustion engine that does not present the environmental hazards of a standard gasoline engine by providing reduced or zero emission of environmentally harmful gases.

It is yet a further object of this invention to provide an improved fuel system for an internal combustion engine that can use an alternative fuel and can use gasoline to facilitate the transition from gasoline to alternative fuels.

It is yet a further object of this invention to provide an improved fuel system for an internal combustion engine that reduces backfire problems.

It is yet a further object of this invention to provide an improved fuel system for an internal combustion engine that reduces backfire problems by cooling the electrode in the spark plug with the hydrogen gas fuel.

It is still a further object of this invention to provide an adapter for use in a fuel system for an internal combustion engine that enhances the power obtained from the alternative fuels.

It is yet a further object of this invention to provide a direct injection fuel system wherein fuel is injected directly into the cylinder.

It is yet a further object of this invention to provide a way to convert the standard induction fuel system of a lawnmower to a direct injection fuel system wherein fuel is injected directly into the cylinder.

It is yet a further object of this invention to provide a way to convert the indirect injection fuel system of an automobile to a direct injection fuel system wherein fuel is injected directly into the cylinder.

The internal combustion engine fuel system of this invention includes a structure for mixing the alternative fuel, preferably hydrogen, with oxygen in ambient air to stratify the fuel. The term "alternative fuels" is known in the art and is meant to refer to fuels other than conventional gasoline.

The invention comprises an adapter, the adapter including a housing mounted between spark plug and cylinder of the internal combustion engine. A plug is placed within the housing. The plug has ridges or grooves on its outer surface that act as mixing structures. Thus, when hydrogen is introduced into the adapter housing it is mixed with ambient oxygen within the chamber as it flows over the plug. The mixing structures on the plug create a vortexing action as the hydrogen flows over the plug and towards the cylinder of the engine.

An electrode protrudes from the plug towards the cylinder. The electrode is preferably platinum and generates the necessary spark to create combustion of the hydrogen/air mixture adjacent to the cylinder to thereby power the cylinder in the engine. A platinum electrode is preferably used because it enhances a catalytic conversion of combustion by-products to more environmentally compatible products.

Thus, the combination of the compression action generated by the conventional piston and push rod within the cylinder of the engine in conjunction with the hydrogen/air mixing structure that vortexes the hydrogen/air create compressed hydrogen that is mixed with a combustion facilitator, i.e. oxygen in the ambient air to enable the system of this invention to capture the abundant energy found in hydrogen fuel.

The enhanced mixing capabilities of this invention is also adaptable for use with other alternative fuels such as natural gas, alcohol, propane and the like.

DESCRIPTION OF THE PREFERRED EMBODIMENT

Figure 1:
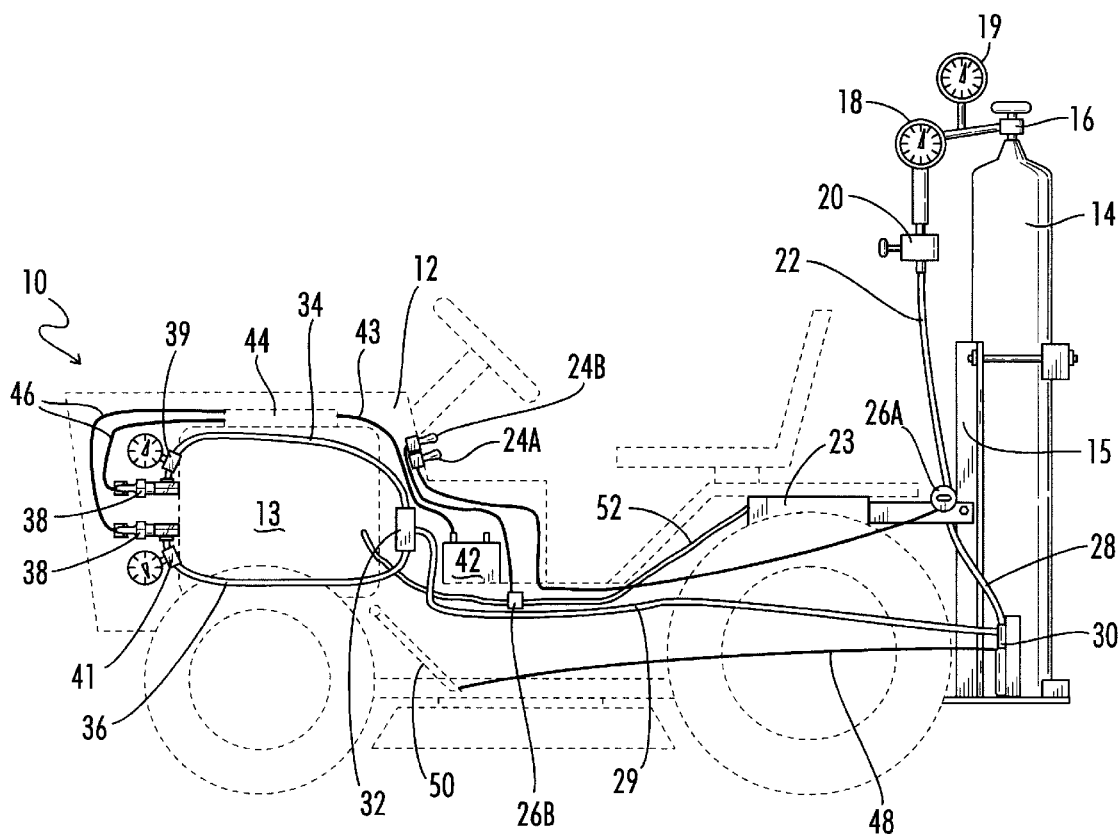
FIG. 1 is a plan view of the fuel system of this invention with a lawn mower shown in phantom.

Referring now to the drawings, wherein like reference numerals refer to like parts throughout, the fuel system is referred to generally at 10. The fuel system of this invention is contemplated for use with an internal combustion power system, such as an internal combustion engine or such as a home heating system. Fuel system 10 is portrayed in this case as connected to a standard lawn mower. The lawn mower is shown in phantom at 12 in FIG. 1. The lawn mower is a conventional lawn mower as can be purchased from a company such as Murray of Ohio. The internal combustion engine in the lawn mower is a standard 4-cycle engine with two cylinders and develops 18 horsepower. A suitable example can be purchased from Briggs & Stratton, Milwaukee, Wis., 53201.

Referring particularly to FIG. 1, system 10 includes fuel tank 14 that is mounted to lawn mower 12 via mounting assembly 15. In the preferred embodiment, fuel tank 14 includes hydrogen gas. Accordingly, for the purposes of the foregoing detailed description, hydrogen gas will be described.

A line 22 begins at fuel tank 14 and proceeds to back-flow valve 16. Back-flow valve 16 is a standard valve and is available from AirCo Gases Company, 575 Mountain Avenue, Murray Hill, N.J. 07974, part no. WCS CV-4M. PSI tank gauge 19 is inserted in line 22 between back-flow valve 16 and flow pressure gauge 18. PSI tank gauge 19 is available from AirCo Gases Company also, part no. WCS CV-5M, and serves as an indicator of fuel remaining in the tank 14. Flow pressure gauge 18 is used to monitor the flow of the hydrogen in pressure units. The flow is started using valve 16. The optimal flow pressure is 25 pounds of flow pressure from the tank 14 to the cylinder of the engine.

The flow of hydrogen is regulated via valve 20 that is part of gauge 18. Thus, when valve 20 is opened, hydrogen proceeds through line section 22 to hydrogen flow solenoid 26A. The user can access the hydrogen fuel by flipping hydrogen flow switch 24A into the "on" mode so that hydrogen gas in line 22 can proceed through hydrogen flow solenoid 26A and into line section 28.

Throttle 30 regulates the flow of hydrogen from line section 28 into line section 29 and ultimately, to engine 13. Throttle 30 is connected to throttle pedal 50 via includes throttle cable 48. Throttle pedal 50 also operates the butterfly valves in the carburetor in engine 13 in a conventional manner.

As an option, the throttle can be controlled electronically by a digital fuel controller product. Such a product is commercially available from Autotronic Controls Corp., 1490 Henry Brennan Drive, El Paso, Tex. 79936.

Line portion 29 proceeds through splitter 32 and is split into upper line 34 and lower line 36. Lines 34 and 36 proceed to adapters 38. Additional back-flow prevention valves 39 and 41 are mounted between lines 34 and 36 and adapters 38. Braided Teflon® is the preferred material for the fuel lines of the system.

Battery 42 is connected via battery cable 43 to magneto 44. Magneto 44 then controls the current through spark plug lines 46 to adapters 38 in a conventional manner. Thus, the regulation of the spark that ignites the fuel in the cylinder of engine 13 is conventional. Additionally, the intake of air into the engine 13 is accomplished through the standard carburetor system of engine 13. In a car, the sparking of the spark plugs can be controlled by the standard distributor/battery ignition system.

A second solenoid 26B controls the flow of gasoline from tank 23 through gasoline line 52. Solenoid 26B is controlled by switch 24B. Throttle 30 is connected to gasoline line 52 and can also be used to control the flow of gasoline to engine 13. Thus, this invention can be used with both an alternative fuel and gasoline.

Figure 2:
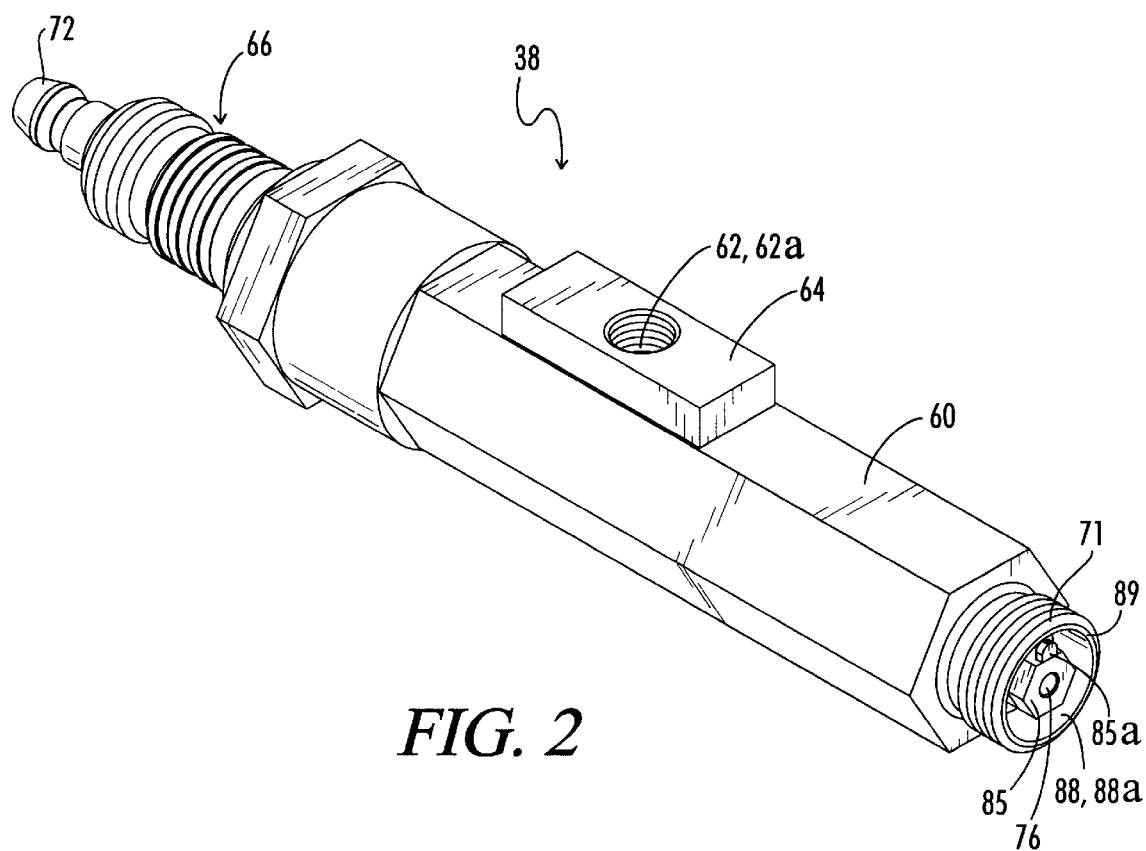
FIG. 2 is a perspective view of the adapter of the fuel system of this invention.
Figure 3:
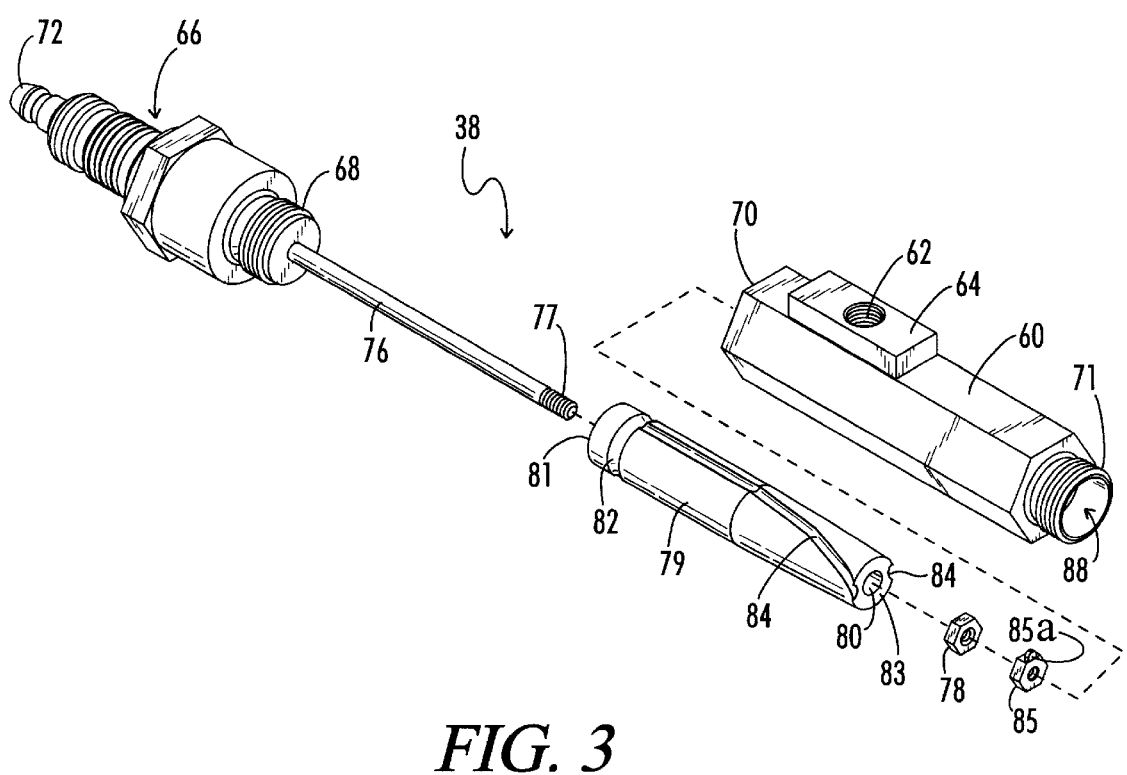
FIG. 3 is an exploded perspective view of the adapter of the fuel system of this invention.
Figure 4:
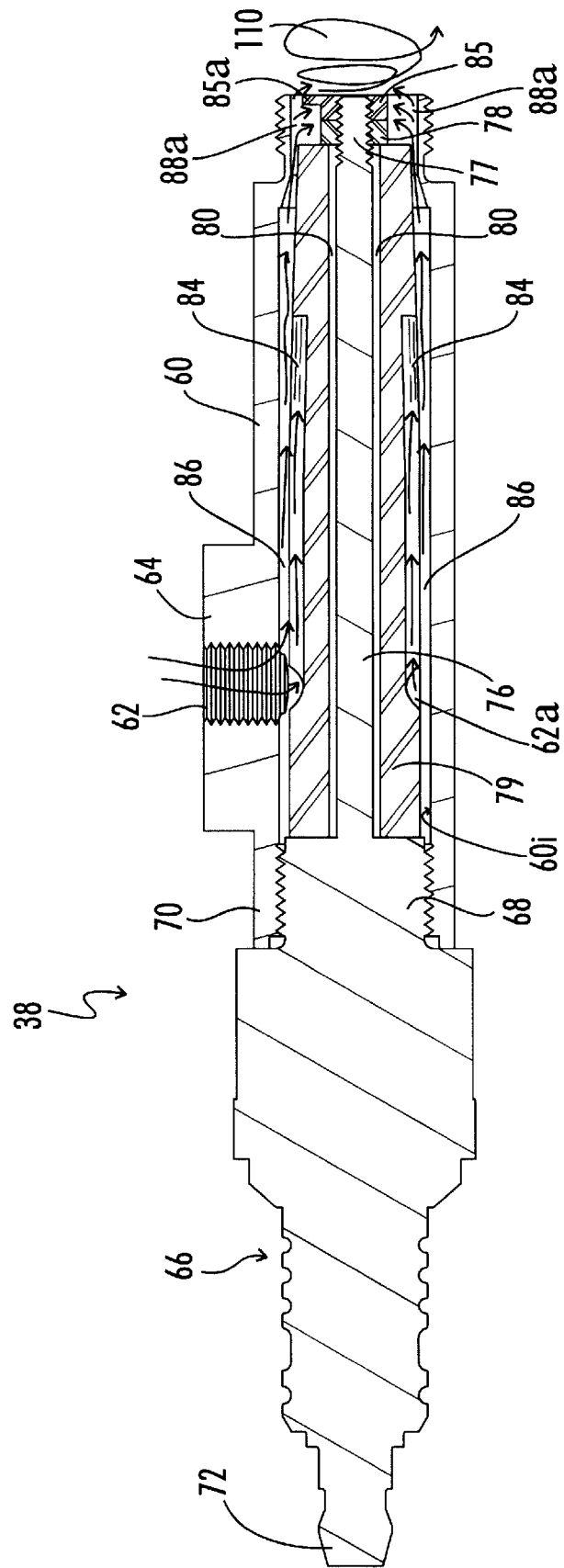
FIG. 4 is a cross-sectional view of the adapter of the fuel system of this invention.
Figure 5A:
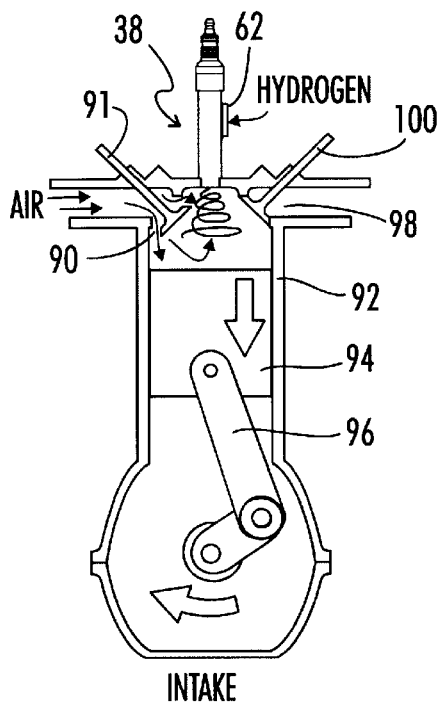
FIGS. 5A–5D are a schematic of the 4 cycle combustion in an internal combustion engine including the adapter of this invention.
Figure 5B:
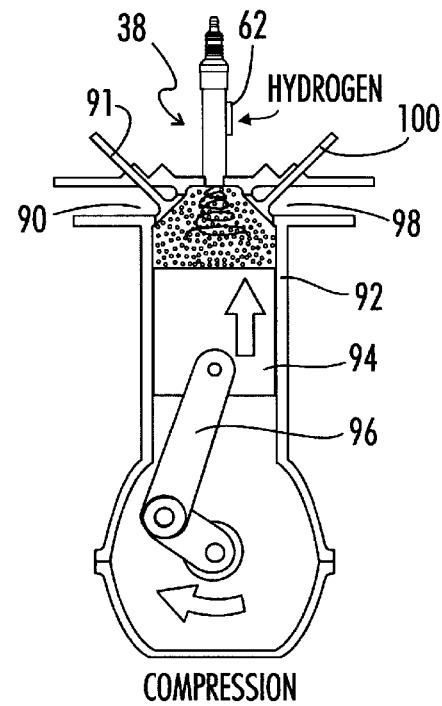
Figure 5C:
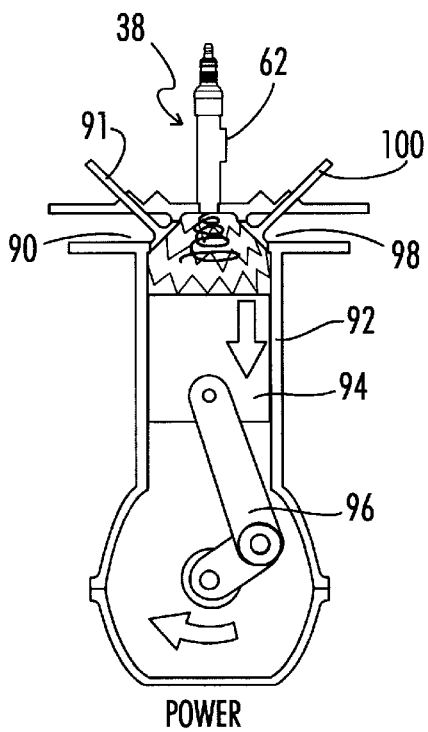
Figure 5D:
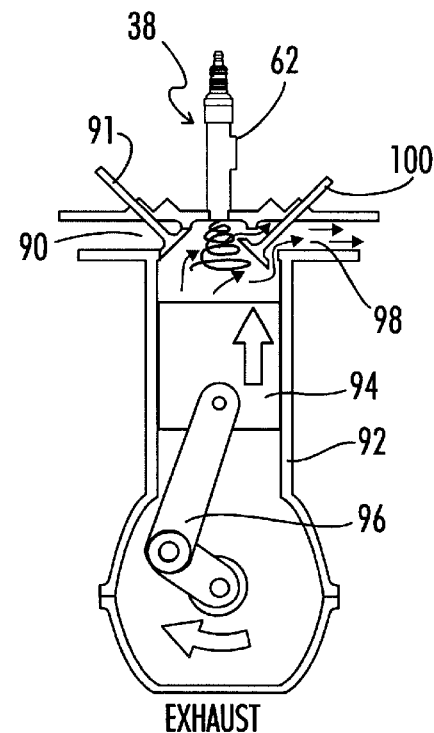
Figure 6:
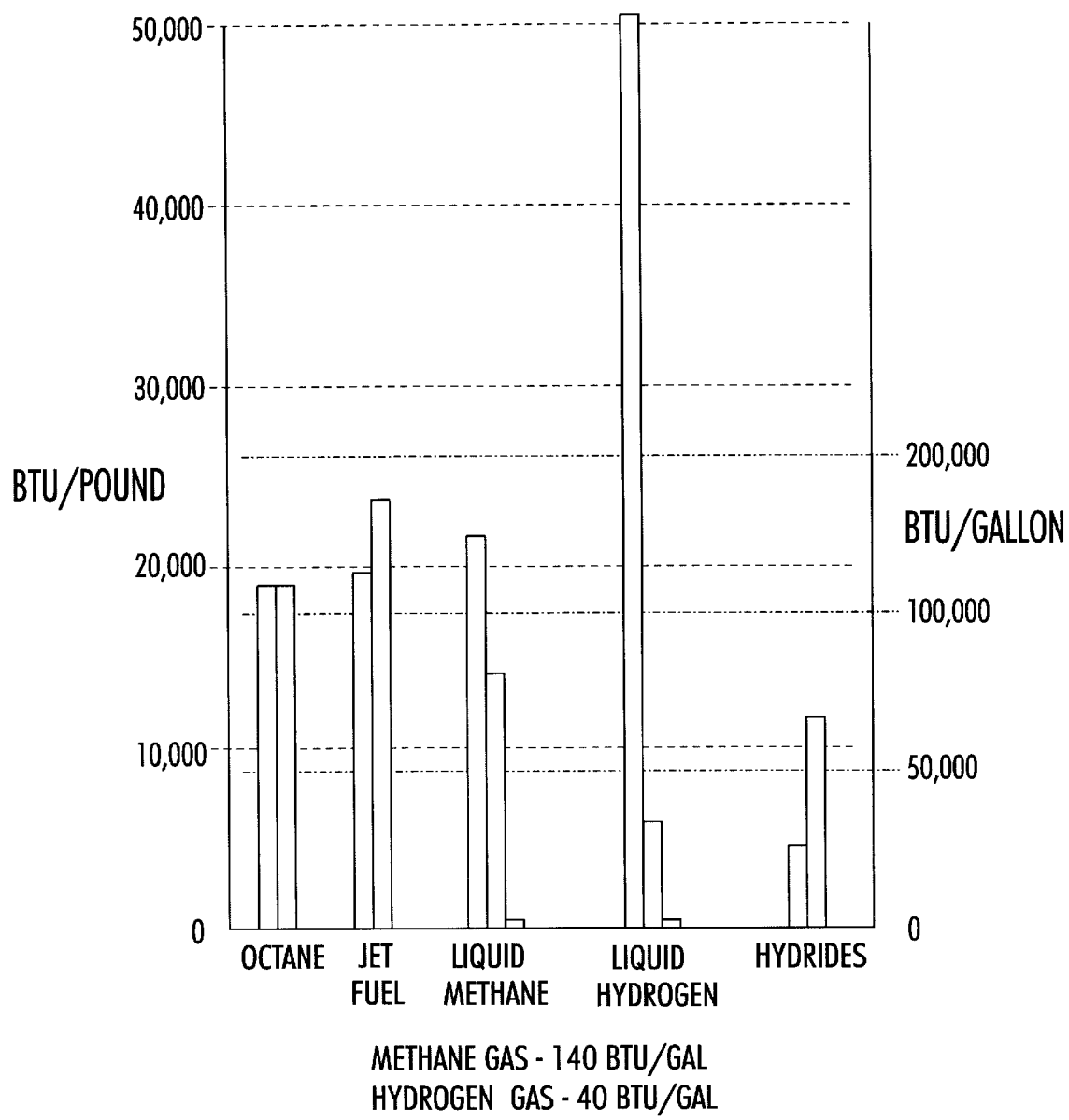
FIG. 6 is a graph which shows the energy potential for hydrogen in BTUs/Lb.

Referring now to FIGS. 2, 3 and 4, the adapter 38 of this invention is shown in more detail. Adapter 38 includes housing 60. A threaded port 62 is formed into housing 60 through port block 64. Hydrogen lines are threadably connected to the adapter 38 via port 62. Port 62 is also referred to as an entrance port.

Adapter 38 also includes spark plug 66 which is effectively a standard spark plug except for the modification to the electrode as described below. Spark plug 66 includes a threaded end 68 which is threadably received in the threaded upper end 70 of housing 60. Spark plug wires 46 (as seen in FIG. 1) are connected to connector end 72 of spark plug base 66.

Electrode 76 protrudes from spark plug 66 and is of a length sufficient so that the threaded tip 77 (best seen in FIGS. 3 and 4) of the electrode 76 is proximate to the cylinder of the internal combustion engine when the adapter 38 is mounted. In one embodiment the electrode 76 is co-terminus with an exit port 88 of the adapter 38. This is most clearly shown in FIG. 4. Electrode 76 is preferably platinum to enhance catalysis of combustion by-products, as will be more fully discussed below.

Adapter 38 also includes plug 79. Plug 79 includes an axial internal void space 80. Thus, plug 79 fits over electrode 76 via internal void space 80. Plug 79 preferably comprises a ceramic material that acts as a good insulator. A suitable source for ceramic plug 79 is AM/PRO Machinery, Inc. 134 Church Street, Plain City, Ohio 43064-1321.

An important aspect of this invention is found on the external surface of plug 79. An annular groove 82 is formed on the surface of plug 79 near its distal end 81 so as to be proximal to the port 62 where hydrogen enters housing 60. Two stratifying grooves 84 proceed along the surface of plug 79 until they reach its distal end 83. It is these mixing structures, i.e. annual groove 82 and stratifying grooves 84, that facilitate the improved power generation from alternative fuels as provided by this invention. It will be apparent to those skilled in the analogous arts that the mixing structure may be formed on an inner surface 60i of the adapter housing 60. Alternatively, a combination of vortex producing structures may be attached to, and preferably integral with, both the plug 79 and the adapter housing inner surface 60i. Also, any conventional vortex producing means would be sufficient, i.e. grooves, per se, are not required. An entrance area 62a proximate the entrance port 62 is typically defined between the housing inner surface 60i and the external surface of plug 79. The external surface of plug 79 typically includes the grooves 84. So, the entrance area 62a is the volume of space within the housing, proximate the entrance port 62, which the gas will be able to occupy. This is most clearly shown in FIG. 4.

On threaded tip 77 of electrode 76, there are mounted a spacer nut 78 and a spark gap nut 85. As best seen in FIG. 2, the spark gap nut 85 includes a protrusion 85a that provides the spark gap between electrode 76 and periphery 89 of the exit port 88 of housing 60. The exit port 88 includes an exit area 88a. This is shown most clearly in FIGS. 2 and 4. The exit area 88a is no larger than the entrance area 62a. If the exit area 88a is smaller than the entrance area 62a, the pressure on the gas will increase. This increases the rate at which the gas is expelled from the plug 79, typically out through grooves 84. The electrode 76 is substantially co-terminus with the plug distal end 83 (seen most clearly in FIG. 2). Thus, the electrode 76 is substantially co-terminus with the exit port 88 or exit area 88a. Note that tip of the electrode 77 is preferably proximate with the exit area 88a because this is the location of greatest mixing. This is most clearly seen in FIG. 4. Preferably, the spark gap nut 85 is brass and the preferred spark gap distance is 25/1000 of an inch.

As best seen in FIG. 4, where arrows represent gas flow, hydrogen gas flows into chamber 60 via port 62. The hydrogen gas cools electrode 76, which facilitates combustion. Stratifying grooves 84, preferably there are two, act to mix the hydrogen that is flowing into housing 60 with ambient air therein. Though, more or less vortex creating grooves (a.k.a. stratifying grooves) may be desired. Typically, this will depend on the relative dimensions of the grooves and diameter of the plug as well as the pressure and velocity of the mixture in the housing. The mixing occurs within void space 86 of housing 60 and creates a vortexing or tornado action. Plug 79 tapers as it proceeds from its distal end 81 to its proximal end 83. Thus, proximal end 83 is smaller in diameter than distal end 81. This provides additional space within void space 86 for the mixing of the hydrogen and air. The stratified hydrogen/air are twisting in a vortex fashion when leaving housing 60 via exit port 88. The vortexing action produced by grooves 84 on the plug 79 creates a "tornado" 110 of hydrogen/air with a hollow center that generates a vacuum. Similar effect, or vortex flow path, would result were the grooves to be placed on the housing. The vacuum propels the hydrogen/air mixture into the cylinder of the engine for combustion. Such mixing cannot be accomplished in a conventional induction system.

Referring now to FIG. 5, a schematic of the system of this invention is portrayed, with arrows representing gas flow. Hydrogen flows in through port 62 through adapter 38 and into cylinder 92. Air enters cylinder 92 through air intake 90 and air intake valve 91. The stratified hydrogen/air mixture is compressed in the compression stroke of the engine via piston 94 and push rod 96, which are standard structures in an internal combustion engine. In the power stroke shown in FIG. 5-C, a spark is generated in the compressed stratified hydrogen/air mixture ignites and drives piston 94 and push rod 96 to power the engine.

The mass energy density of hydrogen is enhanced through the increased pressure on the hydrogen exerted by piston 94 on the hydrogen/air mixture within the cylinder 92 in the uptake stroke in an internal combustion engine. The pressurized and well-mixed hydrogen/air mixture is rapidly ignited through the spark because hydrogen has a fast flame front. This reduces problems with timing. Thus, the energy store found in hydrogen is captured through this system via the compression of the hydrogen gas within cylinder 92 and via the thorough mixing of hydrogen and air provided by adapter 38.

In addition, in the exhaust phase in a four cycle engine a second spark is generated from the plug to ensure complete combustion of by-products. This is enhanced by using an electrode made of platinum. Exhaust leaves cylinder 92 through exhaust port 98. Exhaust port 98 is closed during other phases by exhaust outlet valve 100.

In the exhaust stroke, because air valve 91 is closed, the substantial component of the gases in cylinder 92 is hydrogen. This is also accomplished due to the fact that in the system of this invention, the hydrogen is continuously flowing. When this spark interacts with what is predominately hydrogen, a plasma is formed. This plasma blocks back-flow of air from exhaust port 98. Prevention of back-flow of air prevents the hydrogen fuel system from backfiring, which is another common problem of hydrogen fuel systems. In effect, then, the plasma formed by the hydrogen acts as a virtual valve in that the plasma blocks the back-flow of air.

When the plasma of the hydrogen is generated as described above, UV radiation is generated which also facilitates consumption of combustion by-products. This increases the environmental friendliness of the system.

In addition to hydrogen the following fuels can be used in this system: natural gas; alcohol; gasohol; propane and buthane. A mixture of hydrogen and natural gas can also be used. As noted above, gasoline can be used in this system when solenoid 26 is used to stop the flow of hydrogen.

Further, it is contemplated that an adapter that is described herein for use with an internal combustion engine can also be used with a home heating system such as a home heating system that may currently use natural gas. The vortexing action created by the plug would enable appropriate power to be captured from the hydrogen fuel so as to effectively heat a home.

Thus, the apparatus and system of this invention provides an effective means to use alternative fuels. The use of alternative fuels can enhance the environment by reducing the use of conventional gasoline and the environmentally detrimental by-products caused by the consumption thereof.

Thus, although there have been described particular embodiments of the present invention of a new and useful "Fuel System For Internal Combustion System And Adapter For Use In Same", it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. An adapter for use in an internal combustion power system, the adapter comprising a housing having an internal void space; a plug mounted within the internal void space of the housing, said housing and said plug combining to define an entrance area though which fuel can be introduced, and said housing and said plug combining to define an exit area through which fuel introduced to said entrance area exits, said exit area being no larger than the entrance area; a vortex means for causing fuel exiting through said exit area to have a vortex flow path; and an entrance port into the housing for accepting a fuel supply.

2. The adapter according to claim 1 further comprising an electrode mounted within said plug.

3. The adapter according to claim 1 wherein an end of the plug is smaller in diameter that an other end of the plug.

4. The adapter according to claim 1 wherein the vortex means comprises at least one groove formed along a surface of the plug.

5. The adapter according to claim 4 wherein the vortex means further comprises an annular groove formed on the plug adjacent to said entrance port.

6. The adapter according to claim 1 wherein the mixing structure comprises a ridge.

7. The adapter according to claim 2 wherein the electrode comprises platinum.

8. The adapter of claim 2, wherein the electrode is co-terminus with the exit area.

9. The adapter of claim 1, wherein the housing further comprises an inner surface, the housing inner surface including the vortex means.

10. The adapter of claim 9, wherein the plug comprises complementary vortex means compatible with the vortex means included in the housing inner surface.

11. A fuel system for an internal combustion power system comprising a fuel source, the fuel source in fluid communication with the internal combustion power system; and an adapter connected between the fuel source and the internal combustion power system, the adapter comprising a housing having an internal void space; a plug mounted within the internal void space of the housing, said housing and said plug combining to define an entrance area though which fuel can be introduced, and said housing and said plug combining to define an exit area through which fuel introduced to said entrance area exits, said exit area being no larger than the entrance area; a mixing structure within the housing for causing fuel exiting through said exit area to have a vortex flow path; and an entrance port into the housing for accepting a fuel supply from the fuel source.

12. The fuel system according to claim 11 further comprising an electrode mounted within said plug.

13. The fuel system according to claim 11 wherein an end of the plug is smaller in diameter that an other end of the plug.

14. The fuel system according to claim 11 wherein the mixing structure comprises at least one groove formed along a surface of the plug.

15. The fuel system according to claim 14 wherein the mixing structure further comprises an annular groove formed on the plug adjacent to said port.

16. The fuel system according to claim 11 wherein the mixing structure comprises a ridge.

17. The fuel system according to claim 12 wherein the electrode comprises platinum.

18. The fuel system of claim 12, wherein the electrode is co-terminus with the exit area.

19. The fuel system of claim 11, wherein the housing further comprises an inner surface, the housing inner surface including the mixing structure.

20. The adapter of claim 19, wherein the plug comprises complementary mixing structure compatible with the mixing structure included in the housing inner surface.

21. An adapter for use in an internal combustion engine, the adapter comprising a housing having an internal void space; a plug mounted within the internal void space of the housing, said housing and said plug combining to define an entrance area though which fuel can be introduced, and said housing and said plug combining to define an exit area through which fuel introduced to said entrance area exit; a mixing structure in the housing for causing fuel exiting through said exit area to have a vortex flow path; an electrode axially mounted with the plug and co-terminus with the exit area of the housing; and an entrance port into the housing for accepting a fuel supply.

22. The adapter according to claim 21 wherein an end of the plug is smaller in diameter that an other end of the plug.

23. The adapter according to claim 21 wherein the mixing structure comprises at least one groove formed along a surface of the plug.

24. The adapter according to claim 23 wherein the mixing structure further comprises an annular groove formed on the plug adjacent to said port.

25. The adapter according to claim 21 wherein the mixing structure comprises a ridge.

26. The adapter according to claim 21 wherein the electrode comprises platinum.

27. The adapter according to claim 22 wherein the end of the plug having a smaller diameter is adjacent to a cylinder of the internal combustion engine when the adapter is mounted to an internal combustion engine.

28. The fuel system of claim 21, the housing further comprises an entrance area no smaller than the exit area.

29. The fuel system of claim 21, wherein the housing further comprises an inner surface, the housing inner surface including the mixing structure.

30. A fuel system for an internal combustion engine comprising a fuel source, the fuel source in fluid communication with the internal combustion power system; and an adapter connected between the fuel source and the internal combustion engine, the adapter comprising the adapter comprising a housing having an internal void space; a plug mounted within the internal void space of the housing said housing and said plug combining to define an entrance area though which fuel can be introduced, and said housing and said plug combining to define an exit area through which fuel introduced to said entrance area exit; a mixing structure in the housing for causing fuel exiting through said exit area to have a vortex flow path; an electrode axially mounted with the plug and co-terminus with the exit area of the housing; and an entrance port into the housing for accepting the fuel supply.

31. The adapter according to claim 30 wherein an end of the plug is smaller in diameter that an other end of the plug.

32. The adapter according to claim 30 wherein the mixing structure comprises at least one groove formed along a surface of the plug.

33. The adapter according to claim 32 wherein the mixing structure further comprises an annular groove formed on the plug adjacent to said port.

34. The adapter according to claim 30 wherein the mixing structure comprises a ridge.

35. The adapter according to claim 30 wherein the electrode comprises platinum.

36. The adapter according to claim 31 wherein the end of the plug having a smaller diameter is adjacent to a cylinder of the internal combustion engine when the adapter is mounted to an internal combustion engine.

37. The adapter of claim 30, wherein the housing further comprises an entrance area no smaller than the exit area.

38. The adapter of claim 30, wherein the housing further comprises an inner surface, the housing inner surface including the mixing structure.

* * * * *